US009882775B1

(12) United States Patent
Allen (10) Patent No.: US 9,882,775 B1
(45) Date of Patent: Jan. 30, 2018

(54) DEPENDENT NETWORK RESOURCES

(71) Applicant: Amazon Technologies, Inc., Reno, NV (US)

(72) Inventor: Stewart Robert Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 598 days.

(21) Appl. No.: 14/521,307

(22) Filed: Oct. 22, 2014

(51) Int. Cl.
*G06F 15/16* (2006.01)
*H04L 12/24* (2006.01)
*G06F 12/00* (2006.01)

(52) U.S. Cl.
CPC .......... *H04L 41/0813* (2013.01); *H04L 41/02* (2013.01)

(58) Field of Classification Search
CPC ..... H04L 41/0813; H04L 41/02; H04L 67/10; H04L 67/02; H04L 69/329; H04L 65/1069; H04L 41/0896; H04L 63/102; H04L 41/0843; H04L 41/5054; H04L 41/5087; H04L 65/40; H04L 67/2842; H04L 67/42; H04L 41/0806; H04L 41/082
USPC .......................................... 709/223–229, 250
See application file for complete search history.

(56) References Cited

U.S. PATENT DOCUMENTS

| | | | |
|---|---|---|---|
| 2003/0200356 A1* | 10/2003 | Hue | G06F 8/71 719/322 |
| 2008/0215713 A1* | 9/2008 | Cannon | H04L 12/24 709/221 |
| 2010/0115515 A1* | 5/2010 | Drabant | G06Q 10/06 718/100 |
| 2011/0320605 A1* | 12/2011 | Kramer | H04L 41/0843 709/226 |
| 2013/0064118 A1* | 3/2013 | Robinson | H04W 16/14 370/252 |
| 2013/0117806 A1* | 5/2013 | Parthasarathy | G06F 21/604 726/1 |
| 2013/0185715 A1* | 7/2013 | Dunning | G06F 9/45558 718/1 |
| 2013/0246470 A1* | 9/2013 | Price | G06F 21/6218 707/783 |
| 2015/0347093 A1* | 12/2015 | Dowd | G06F 9/5011 717/101 |

* cited by examiner

*Primary Examiner* — Zarni Maung
(74) *Attorney, Agent, or Firm* — Baker & Hostetler LLP (57) ABSTRACT

In certain aspects, where a network resource is configured (e.g., created, launched, modified, etc.) the dependencies between the network resource and other resources can be determined and stored. Subsequently, then a request is made to reconfigure the network resource, the stored dependencies can be accessed to determine whether or not to allow such a requested reconfiguration.

20 Claims, 7 Drawing Sheets

DEPENDENT NETWORK RESOURCES

BACKGROUND

There exist web services platforms that may perform compute tasks for remote client computers or other entities. These web services platforms may comprise a plurality of network resources, which may each comprise a plurality of physical host computers that in turn host at least one virtual machine (VM) instances (as used herein, both physical computers, VM instances, and network services may be referred to as network resources). In certain instances, at least one network resource may logically depend on another network resource to provide certain services or facilitate certain functions. There are times when a network resource is modified, such as removed, and the modification does not allow other network resources to function properly.

BRIEF DESCRIPTION OF DRAWINGS

Throughout the drawings, reference numbers may be re-used to indicate correspondence between referenced elements. The drawings are provided to illustrate example aspects described herein and are not intended to limit the scope of the disclosure.

DETAILED DESCRIPTION

In an aspect, a computing platform such as a web services platforms can provide a tagging mechanism to represent dependencies between two or more network resource. Network resources may comprise physical host computers, virtual machine (VM) instances, and/or logic components, for example. Network resources may be used to provide at least one network services to at least one user. In certain aspects, where a network resource is configured (e.g., created, launched, modified, etc.) the dependencies between the network resource and other resources can be determined and stored. Subsequently, then a request is made to reconfigure the network resource, the stored dependencies can be accessed to determine whether or not to allow such a requested reconfiguration. As an illustrative example, a user may access the web services platform and attempt to delete a virtual network interface. However, another network resource such as a load balance, for example, may depend on the virtual network interface to support interface functionality of the load balancer. As such, deleting the virtual network interface may cause the load balancer to function improperly or not at all. By determining and storing information relating to the dependencies between network resources, configuration of such network resources can be managed to minimize interruption in the functioning of at least one network resource. As an example, one or more of client-side dependency information and server-side dependency information may be determined and referenced to manage configurations of network resources.

In another aspect, permission (e.g., access control) may be used to define the types of configurations at least one users have for a particular network resource. For example, permissions may be used to allow only administrators to remove a network resource or function of a network resource. As an example, the use of permission may be complementary to the analysis of dependencies described herein.

Figure 1:
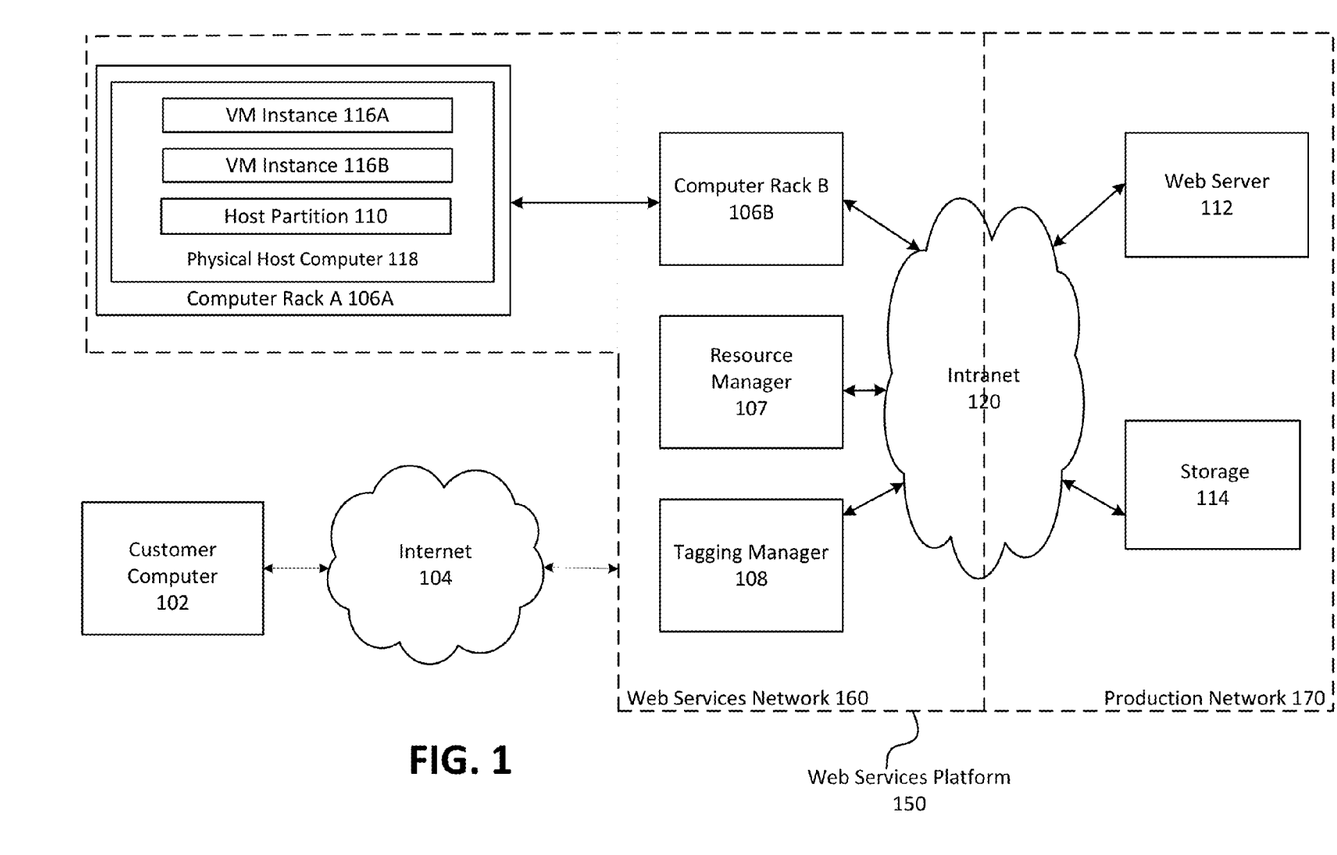
FIG. 1 depicts an example operating environment in which aspects may be implemented.
Figure 2:
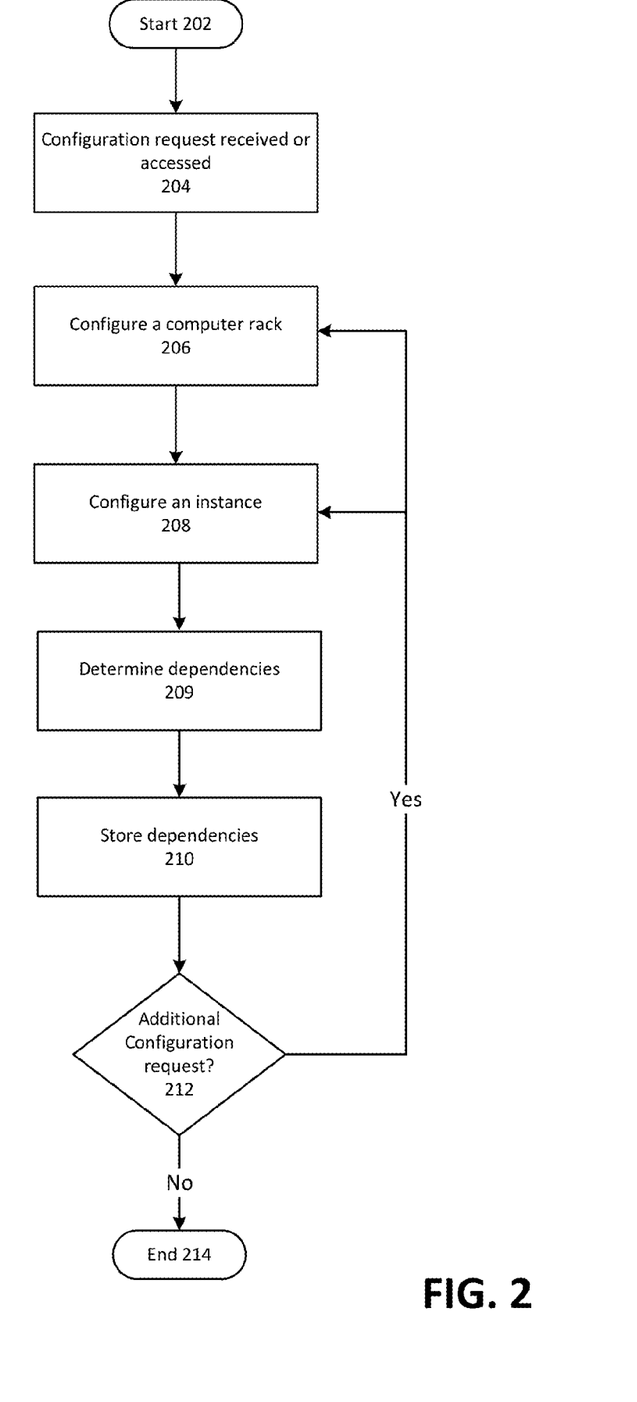
FIG. 2 depicts example operating procedures for configuring at least one network resource in an operating environment, such as the operating environment of FIG. 1.
Figure 3:
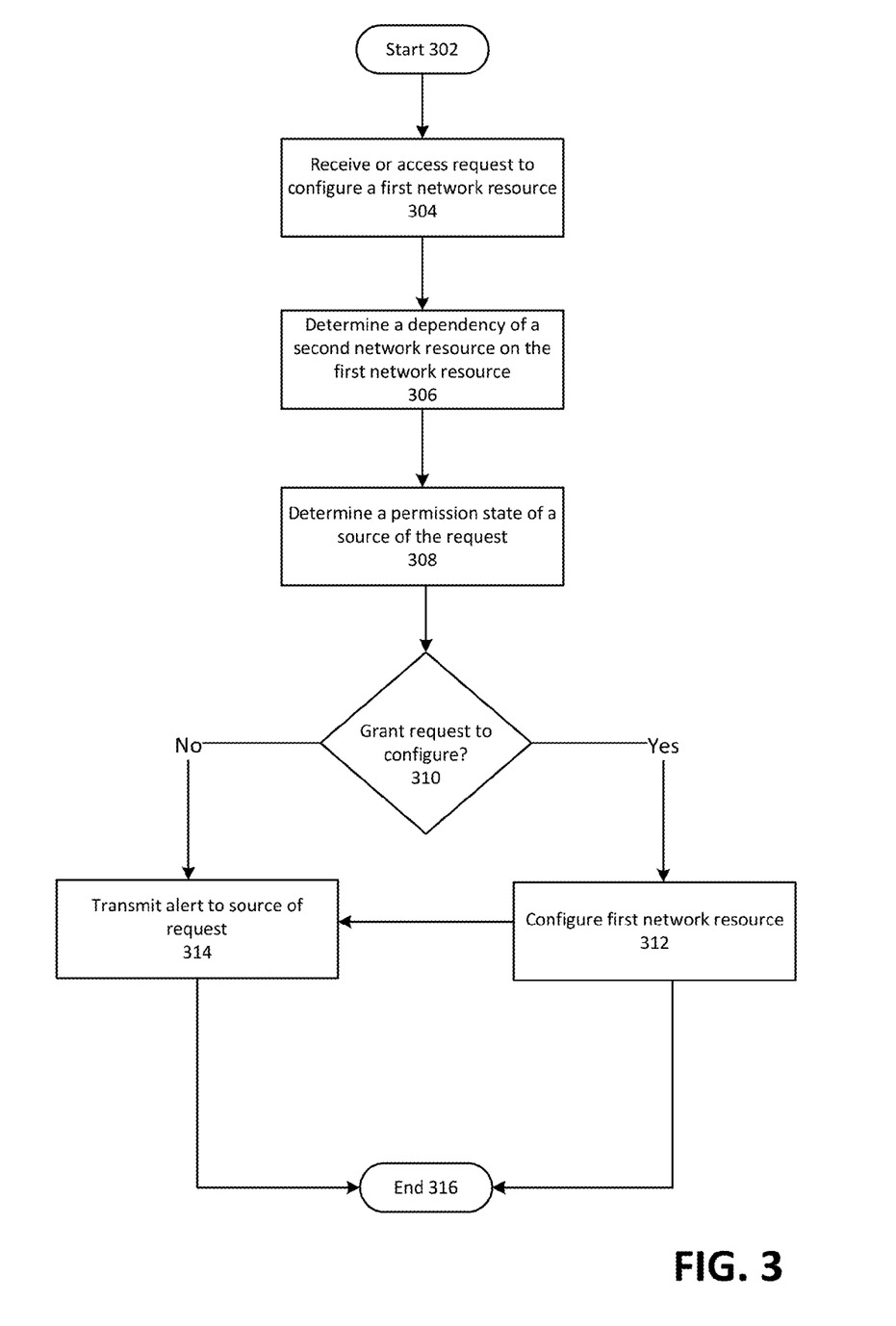
FIG. 3 depicts example operating procedures for managing the configuration of at least one network resource in an operating environment, such as the operating environment of FIG. 1.
Figure 4:
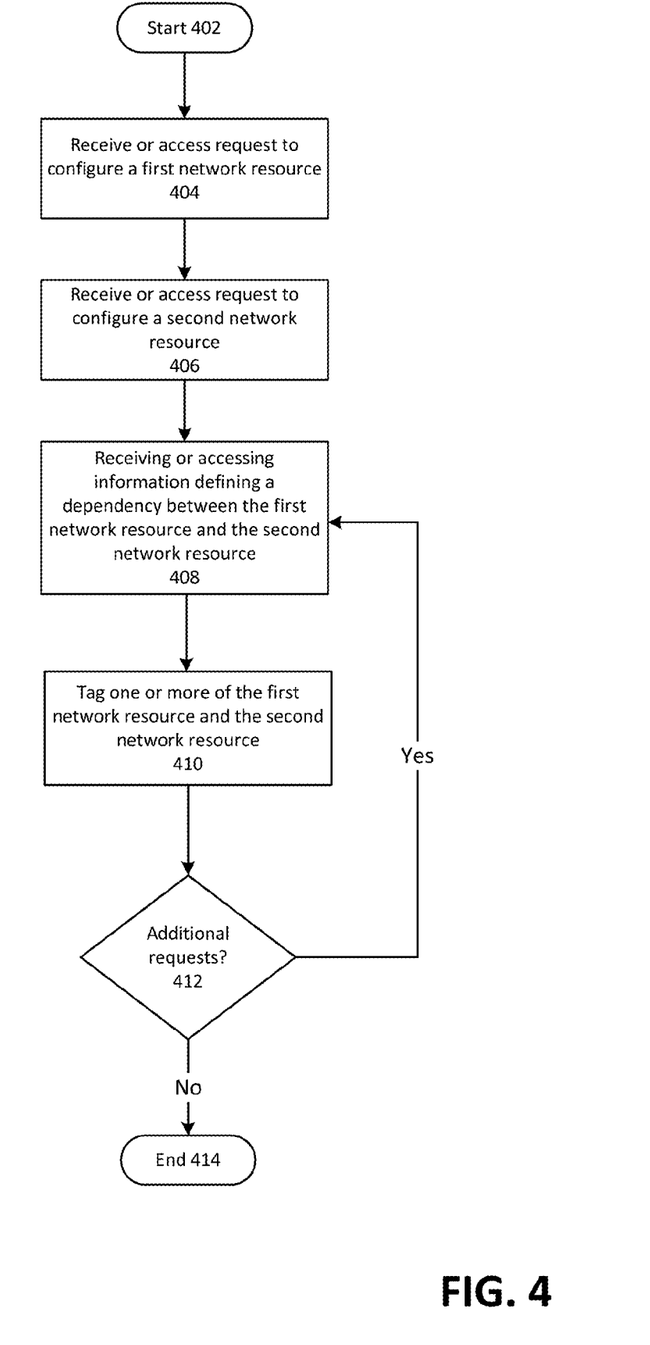
FIG. 4 depicts example operating procedures for tagging at least one network resource in an operating environment, such as the operating environment of FIG. 1.
Figure 5:
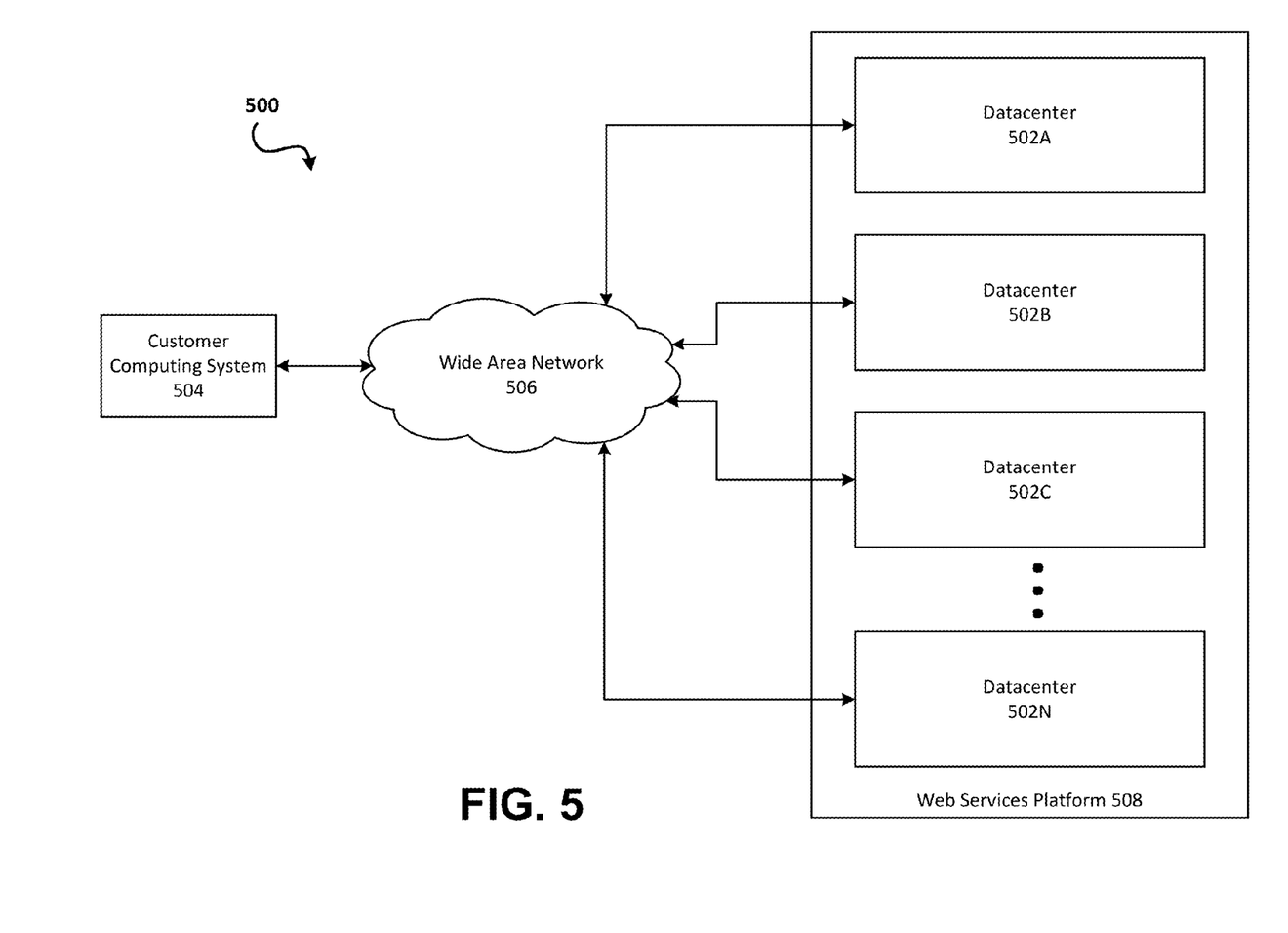
FIG. 5 depicts a web services platform, such as in FIG. 1, that comprises a plurality of datacenters.
Figure 6:
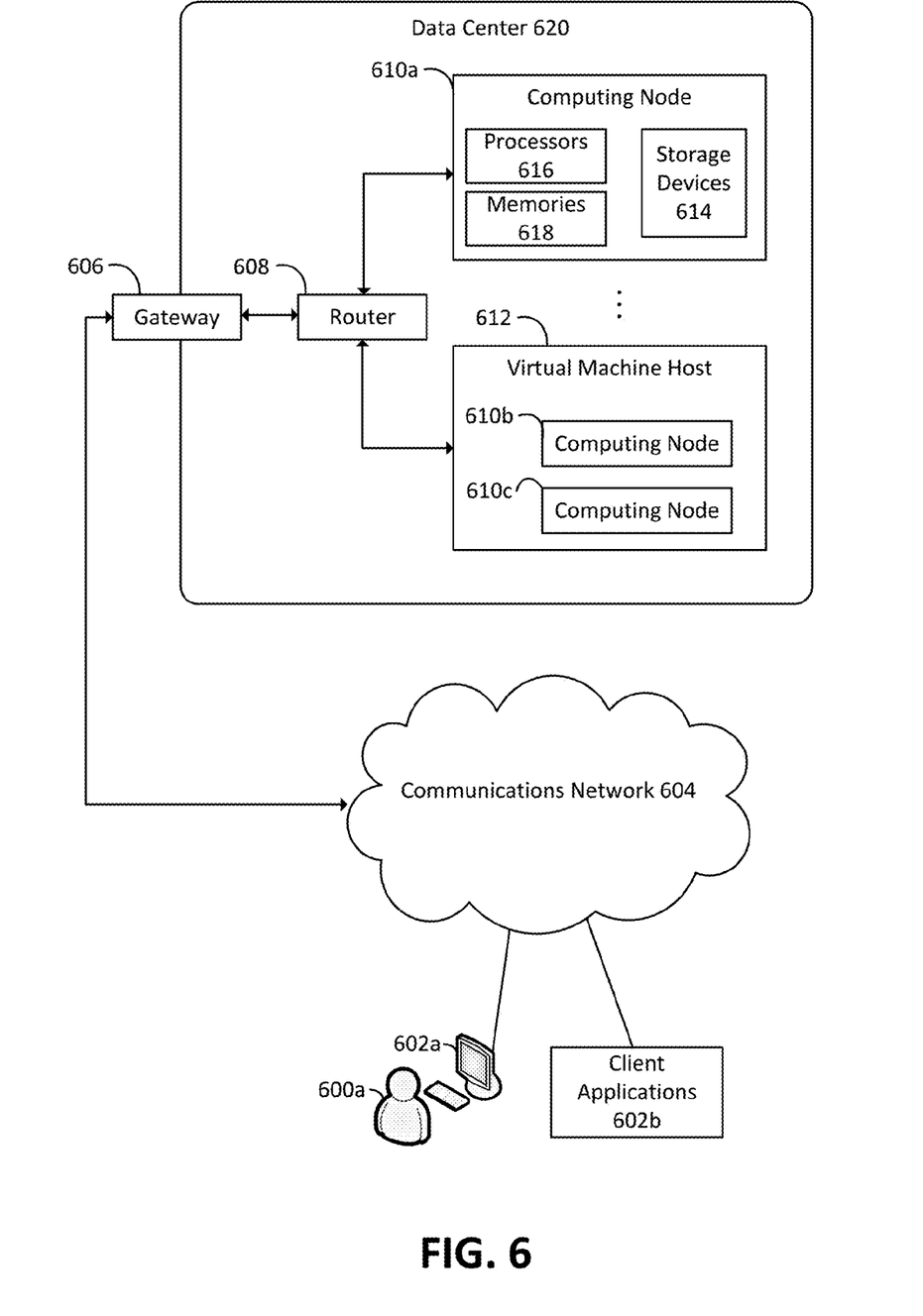
FIG. 6 is a block diagram depicting an embodiment of a computing environment in which aspects of the present disclosure may be practiced.
Figure 7:
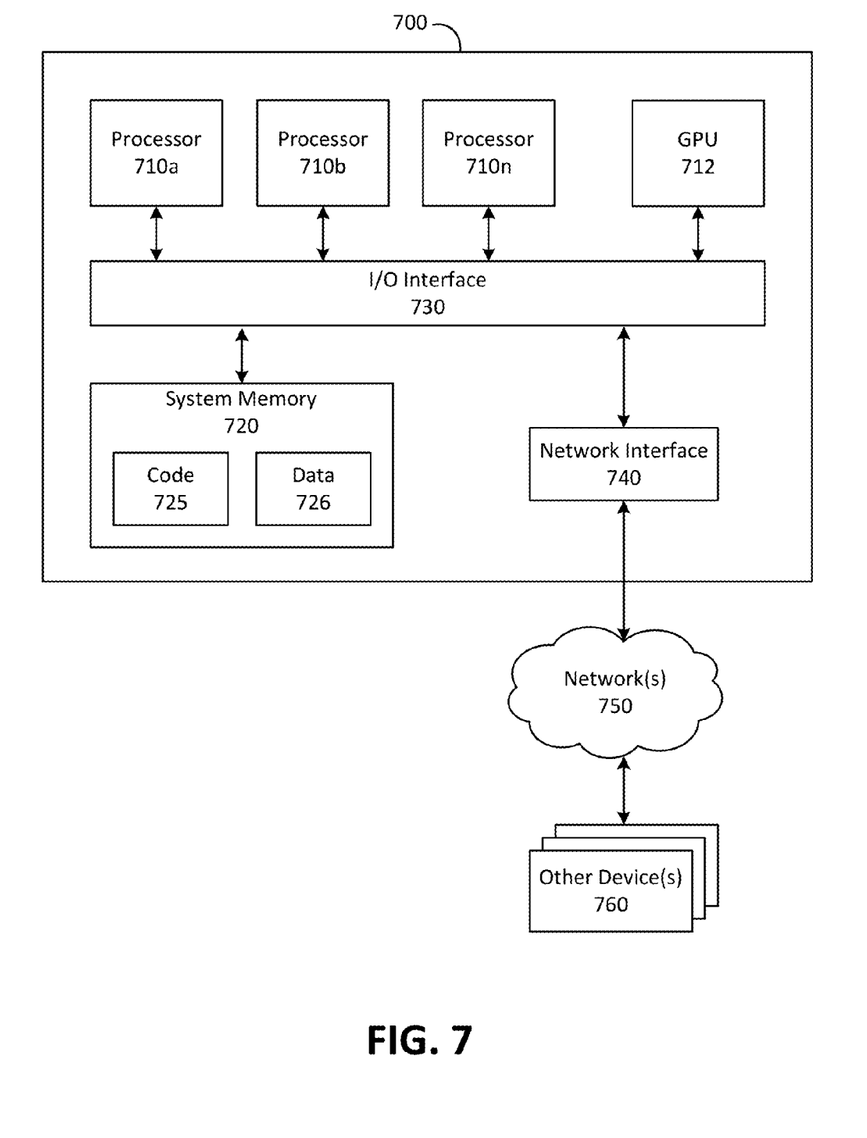
FIG. 7 is a block diagram depicting an embodiment of a computing system on which aspects of the present disclosure may be practiced.

Turning now to the figures, they begin with example environments in which these techniques may be implemented (FIG. 1). Then, they move to example operating procedures that may be implemented to perform some of these techniques (FIGS. 2-4). And they conclude with further detail of example environments in which these techniques may be implemented (FIGS. 5-7).

FIG. 1 depicts an example operating environment in which aspects may be implemented. In aspects, web services platform 150 may communicate with customer computer 102 via Internet 104. Web services platform 150 may provide computing services to customer computer 102 by executing at least one virtual machine (VM) instances on a computer of computer rack A 106A or computer rack B 106B, under the direction of customer computer 102. Such computing services may comprise a compute cloud service, a cloud storage service, a relational database service, a NoSQL database service, a non-relational data storage service, a workflow service, a queue service, a notification service, and/or a content delivery service, for example. Web services platform 150 may also serve web pages to customer computer 102 from web server 112, or store data for customer computer 102 in storage 114. In aspects, storage 114 may store data as objects (e.g., files) and/or as key-value pairs. It may be appreciated that there are aspects where a block-level storage service is implemented instead of, or in addition to, storage 114.

The components of web services platform 150—computer rack A 106A, computer rack B 106B, resource manager 107, tagging manager 108, web server 112, and storage 114—may be connected to each other via intranet 120. The resource manager 107 may be configured to manage the configuration (e.g., initialization, start-up, recovery, registration, removal, etc.) of at least one network resource such as computer racks 106A, 106B, virtual machine instances 116 (depicted here as VM instance 116A and VM instance 116B), or network services. The tagging manager 108 may be integrated with the resource manager 107 or may be a distinct component. Intranet 120 may comprise networking equipment such as switches, routers, firewalls, and load balancers. In an aspect, where VM instance 116A is configured, tagging manager 108 may determine at least one dependency between the VM instance 116A and another network resource (e.g., VM instance 116B). Such determined dependencies can be stored (e.g., tagged), for example, as key-value pairs. Techniques for determining dependencies between network resources and storing the determined dependencies are depicted in the following figures.

Computer rack A 106A and computer rack B 106B are physical racks configured to hold at least one physical computers, such as physical host computer 118. In turn, each physical host computer is configured to execute at least one virtual machine instances 116 and a host partition 110. These VM instances may execute on behalf of customer computer 102 (or another entity) to provide compute services to customer computer 102.

As depicted, web services platform 150 is divided into two logical components—web services network 160 and production network 170. In turn, as depicted, web services network 160 generally comprises a portion of web services platform 150 that offers compute services to users. In turn, production network 170 as depicted comprises web server 112 and storage 114, and may generally host a web site for web services platform 150. Other configurations of the web services platform 150 may be implemented. For example, the tagging manager 108 may be part of the web services network 160 and/or the production network 170 or may be a stand-alone component.

Web services network 160 and production network 170 may be considered to be separate intranets within web services platform 150, where communications between the two intranets is generally restricted relative to communications within an intranet. For example, each intranet may host a computer that has the same Internet Protocol (IP) address, and so addressing communications between these two computers may involve some degree of Network Address Translation (NAT) that may not be involved in communications between two computers solely within production network 170.

In certain aspects, where a network resource is configured (e.g., created, launched, modified, etc.) the dependencies between the network resource and other resources can be determined and stored. Subsequently, then a request is made to reconfigure the network resource, the stored dependencies can be accessed to determine whether or not to allow such a requested reconfiguration. FIG. 2 depicts example operating procedures for tagging at least one network resource, such as computer racks 106A, 106B and/or VM instances 116 of FIG. 1. In aspects, the operating procedures of FIG. 2 may be implemented by resource manager 107 or tagging manager 108 of FIG. 1 to tag the at least one network resource. The operating procedures of FIG. 4 relate to tagging at least one network resource based on analysis of dependencies between the network resources. It may be appreciated that there are aspects that do not implement all of the operating procedures depicted in FIG. 2, or implement the depicted operating procedures in a different order than is depicted.

In an aspect, the operating procedures of FIG. 2 begin with operation 202 and move to operation 204. In operation 204, a request to configure at least one network resource (e.g., computer racks 106A, 106B, VM instances 116, web services, etc.) may be received or accessed, for example via the web services platform 150. The request to configure the network resource may comprises a request to create the network resource, delete the network resource, move the network resource, or define certain functionality associated with the network resource. As an example, the network resource may comprise at least one of a virtual machine instance, a container, a virtual network device, a virtual gateway device, a virtual network, a compute cloud service, a cloud storage service, a relational database service, a NoSQL database service, a non-relational data storage service, a workflow service, a queue service, a notification service, and a content delivery service. Other services and components can be embodied as the network resource.

In operation 206, if the request relates to a computing rack such as computer racks 106A, 106B, the resource manager 107 and/or tagging manager 108 may configure the particular computing rack. As an example, such configuration of the computing rack may include load balancing, identification, security, storage management, network communication policies, application of service-level agreement, and the like. As a further example, the configuration of the computing rack (e.g., parent network resource, computing host) may include a registration process with web services platform 150.

Operation 208 may be reached from operation 204 or operation 206. In operation 208, if the request relates to a VM instance such as VM instances 116, the resource manager 107 and/or tagging manager 108 may configure the particular VM instance. As an example, such configuration of the VM instance may include load balancing, identification, security, storage management, network communication policies, application of service-level agreement, and the like. As a further example, the configuration of the VM instance may include a selection of a computing rack or host on which the VM instance should be launched. As yet a further example, the configuration of the VM instance (e.g., child network resource) may include a registration process with web services platform 150.

Operation 209 may be reached from operation 206 or operation 208. In operation 209, dependencies relating to the configured network resources (e.g., computer racks 106A, 106B, VM instances 116, etc.) may be determined, for example, by the resource manager 107 and/or tagging manager 108. In an aspect, during the configuration operation 206 or 208, dependency information can be received or accessed by the resource manager 107 and/or tagging manager 108 and can be integrated as part of the configuration process. For example, configurations of each network resource may be analyzed to retrieve a frequency of reference of another network resource. As a further example, an operation of each of the first and second network resource may be analyzed to retrieve a frequency of use (e.g., execution, invocation, call, etc.) of another network resource. The dependency between the network resources may comprises a computing dependency that facilitates the operation a feature of one of the network resources based on another resource. In an aspect, the information defining the dependency between the network resources may comprise a criticality of the dependency. For example, criticality may relate to the frequency of reference and/or use of one network resource by another network resource. As a further example, criticality of resources may be predetermined or may be discovered based on actual usage.

Operation 210 may be reached from operation 209. In operation 210, information relating to the dependencies determined in operation 209 may be stored, for example to storage 114 by the resource manager 107 and/or tagging manager 108. In an aspect, at least one network resource may be tagged to represent the dependency information. As an example, information relating to the dependencies may be stored as metadata. As another example, dependency information may be stored as a key-value pair. As a further example, dependency information may be stored as a dependency tree or topology of the network resources. The information relating to dependencies may be stored at a central location (e.g., storage 114), client-side, server-side, and/or may be distributed for redundancy, for example. As a further example, aggregate information may be determined and stored across various network resources.

In certain aspects, the stored information may be subsequently accessed. For example, the stored information may be presented via a user interface (e.g., customer computer 102) in the form of a key-value listing, a topology map, a dependency tree, and the like. As a further example, the stored information may be selectively queried based on various classifications such as resource identifier, file identifier, number of dependencies, criticality of dependencies, number of parent/dependees, number of child/dependents, and the like. Stored dependency information may relate to specific files, code segments, or grouping of information that may be used by one or more network resource. Stored dependency information may relate to individual network resources or groupings of network resources.

Operation 210 may be followed by operation 212. Where in operation 212 it is determined that there is another configuration request received in operation 204, the operating procedures of FIG. 2 may return to operation 206 or operation 208. Instead, where in operation 212 it is determined that there is not another configuration request, the operating procedures of FIG. 2 move to operation 216, where the operating procedures of FIG. 2 end.

FIG. 3 depicts example operating procedures for managing access to at least one network resource, such as computer racks 106A, 106B and/or VM instances 116 of FIG. 1. In aspects, the operating procedures of FIG. 3 may be implemented by resource manager 107 or tagging manager 108 of FIG. 1 to determine access to at least one network resource. The operating procedures of FIG. 3 relate to granting or denying configuration of network resources based on analysis of dependencies between the network resources. It may be appreciated that there are aspects that do not implement all of the operating procedures depicted in FIG. 3, or implement the depicted operating procedures in a different order than is depicted.

In an aspect, the operating procedures of FIG. 3 begin with operation 302 and move to operation 304. In operation 304, a request to configure a first network resource of a plurality of network resources may be received or accessed, for example via the web services platform 150. The request to configure the first network resource may comprises a request to create the first network resource, delete the first network resource, move the first network resource, change access controls relating to the first network resource, or define certain functionality associated with the first network resource. As an example, the first network resource may comprise at least one of a compute cloud service, a cloud storage service, a relational database service, a NoSQL database service, a non-relational data storage service, a workflow service, a queue service, a notification service, and a content delivery service. Other services and components can be embodied as the first network resource.

Operation 306 may be reached from operation 304. In operation 306, a dependency of a second network resource on the first network resource may be determined, for example by the resource manager 107 and/or tagging manager 108. In an aspect, determining the dependency may comprise receiving or accessing information defining a dependency between the first network resource and the second network resource. The information may be received or accessed in response to the request to configure the first network resource. The information may be automatically received or accessed from metadata, a database, or other datasource. The information may be received or access by determining a frequency of reference or user of one of the first and second network resources by the other. For example, configurations of each of the first and second network resource may be analyzed to retrieve a frequency of reference of another network resource. As a further example, an operation of each of the first and second network resource may be analyzed to retrieve a frequency of use (e.g., execution, invocation, call, etc.) of another network resource. The dependency between the first network resource and the second network resource may comprises a computing dependency that facilitates the operation a feature of one of the first network resource and the second network resource based on the other of the first network and the second network resource. The dependency may be determined based on client-side information, server-side (e.g., provider side) information, and/or aggregate information. In an aspect, the information defining the dependency between the first network resource and the second network resource may comprise a criticality of the dependency. For example, criticality may relate to the frequency of reference or use of one network resource by another network resource.

Operation 308 may be reached from operation 306. In operation 308, a permission state of a source of the request may be determined, for example by a component of web services platform 150 such as the resource manager 107 and/or tagging manager 108. Other components or logic may determine the permission state. In an aspect, an identifier of the source of the request in operation 304 may be compared against a permissions list such as an access control list and the like. As an example, the permission state may comprise at least one predefined access rights for the identified source. Such access rights may comprise creation, removal, modification, read-only, write-only, administrative, non-administrative, or other designation defining the access permitted to the source.

Operation 310 may be reached from operation 308. In operation 310, a decision may be made to grant or deny the request to configure from operation 304, for example by the resource manager 107 and/or tagging manager 108, or decision logic relating to the web services platform 150. In an aspect, the decision may be based at least in part on the dependency of the second network resource and/or the permission state of the source of the request. As an example, a decision rule may be executed analyze the dependency of the second network resource to determine whether the request should be granted or denied. The rule may compare the dependency information to a predetermined white list or black list for granting or denying requests, respectively. The rule may be configured to traverse a dependency tree representing the dependency information of operation 306 to determine a criticality of the request on the operation of other network resources.

Operation 312 may be reached from operation 310. In operation 312, the first network resource may be configured based on the request of operation 304, for example by the resource manager 107 and/or tagging manager 108.

Operation 314 may be reached from operation 310 or operation 312. In operation 314, an alert may be transmitted to the source of the request from operation 304, for example by a component of the web services platform 150 such as the resource manager 107 and/or tagging manager 108. In an aspect, the alert may comprise information relating to grant or denial of the request. As an example, the alert may comprise information relating to the dependency of a second network resource on the first network resource. As a further example, the alert may comprise information identifying to the dependency of a second network resource on the first network resource. Following the grant or denial of the request, the operating procedures of FIG. 3 may move to operation 316, where the operating procedures of FIG. 3 end.

FIG. 4 depicts example operating procedures for tagging at least one network resource, such as computer racks 106A, 106B and/or VM instances 116 of FIG. 1. In aspects, the operating procedures of FIG. 4 may be implemented by resource manager 107 or tagging manager 108 of FIG. 1 to tag the at least one network resource. The operating procedures of FIG. 4 relate to tagging at least one network resource based on analysis of dependencies between the network resources. It may be appreciated that there are aspects that do not implement all of the operating procedures depicted in FIG. 4, or implement the depicted operating procedures in a different order than is depicted.

In an aspect, the operating procedures of FIG. 4 begin with operation 402 and move to operation 404. In operation 404, a request to configure a first network resource of a plurality of network resources may be received or accessed, for example, by a component of the web services platform 150. The request to configure the first network resource may comprises a request to create the first network resource, delete the first network resource, move the first network resource, change access controls relating to the first network resource, or define certain functionality associated with the first network resource. As an example, the first network resource may comprise at least one of a compute cloud service, a cloud storage service, a relational database service, a NoSQL database service, a non-relational data storage service, a workflow service, a queue service, a notification service, customer applications, and a content delivery service. Other services and components can be embodied as the first network resource.

Operation 406 may be reached from operation 404. In operation 406, a request to configure a second network resource of the plurality of network resources may be received or accessed, for example, by a component of the web services platform 150. The request to configure the second network resource may comprises a request to create the second network resource, delete the second network resource, move the second network resource, change access controls relating to the second network resource, or define certain functionality associated with the second network resource. As an example, the second network resource may comprise at least one of a compute cloud service, a cloud storage service, a relational database service, a NoSQL database service, a non-relational data storage service, a workflow service, a queue service, a notification service, customer applications, and a content delivery service. Other services and components can be embodied as the first network resource.

Operation 408 may be reached from operation 406. In operation 408, information defining a dependency between the first network resource and the second network resource may be received or accessed, for example by the resource manager 107 and/or tagging manager 108. The information may be received or accessed in response to at least one of the request to configure the first network resource and the request to configure the second network resource. The information may be automatically received or accessed from metadata, a database, or other datasource. The information may be received or access by determining a frequency of reference or user of one of the first and second network resources by the other. For example, configurations of each of the first and second network resource may be analyzed to retrieve a frequency of reference of another network resource. As a further example, an operation of each of the first and second network resource may be analyzed to retrieve a frequency of use (e.g., execution, invocation, call, etc.) of another network resource. The dependency between the first network resource and the second network resource may comprises a computing dependency that facilitates the operation a feature of one of the first network resource and the second network resource based on the other of the first network and the second network resource. In an aspect, the information defining the dependency between the first network resource and the second network resource may comprise a criticality of the dependency. For example, criticality may relate to the frequency of reference or use of one network resource by another network resource.

Operation 410 may be reached from operation 408. In operation 410, at least one of the first network resource and the second network resource may be tagged to represent the dependency between the first network resource and the second network resource. As an example, tagging at least one of the first network resource and the second network resource comprises storing at least a portion of the received information as metadata associated with the at least one of the first network resource and the second network resource, for example to storage 114 by the resource manager 107 and/or tagging manager 108. As a further example, tagging at least one of the first network resource and the second network resource comprises storing at least a portion of the received information as a key-value pair associated with the at least one of the first network resource and the second network resource.

Operation 412 may be followed by operation 414. Where in operation 414 it is determined that there is another request to configure a network resource, the operating procedures of FIG. 4 may return to operation 406. Instead, where in operation 414 it is determined that there is not another request, the operating procedures of FIG. 4 move to operation 416, where the operating procedures of FIG. 4 end.

FIGS. 5-7 are similar to FIG. 1 in that they depict example operating environments in which aspects disclosed herein may be implemented, and said figures depict these operating environments at varying levels of granularity. FIG. 5 generally depicts a web services platform that comprises a plurality of datacenters. FIG. 6 generally depicts a datacenter that comprises a plurality of computers. FIG. 7 generally depicts a computer that may be part of a datacenter. Any of the devices, computers, servers, and/or instance may be considered network resources, as used herein.

It may be appreciated that the operating environments of FIGS. 5-7 may be used to implement aspects of the operating environment of FIG. 1. For example, web services platform 150 and its components may be implemented in web services platform 508 of FIG. 5. Likewise, Internet 104 of FIG. 1 may be wide area network 506 of FIG. 5, physical host computer 106, resource manager 107, tagging manager 108, web server 112, and storage 114 may each be customer computing system 504 of FIG. 5 and/or computing device 700 of FIG. 7.

Turning now to details of FIG. 5, this figure depicts an example of a suitable computing environment in which aspects described herein may be implemented. A cloud service provider (such as web services platform 508) may configure the illustrated computing environment to host virtual clouds of entities and to enable communication paths between these virtual clouds that may otherwise be isolated. In particular, FIG. 5 is a system and network diagram that shows an illustrative operating environment 500 that includes a web services platform 508 for implementing virtual clouds and for providing on-demand access to compute resources, such as virtual machine instances. Web services platform 508 may provide compute resources for executing applications on a permanent or an as-needed basis and may be configured as a private network. These compute resources may include various types of resources, such as data processing resources, data storage resources, data communication resources, and the like. Each type of compute resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of compute resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The compute resources provided by web services platform 508 may be enabled by at least one datacenters 502A-502N, which may be referred herein singularly as "datacenter 502" or in the plural as "datacenters 502." Datacenters 502 may be facilities that house and operate computer systems and associated components and may include redundant and backup power, communications, cooling, and security systems. Datacenters 502 may be located in a same geographical area, such as in a same facility, and may be interconnected using private networks, such as high-speed fiber optic networks, controlled and managed by a service provider of web services platform 508. Datacenters 502 may also be distributed across geographically disparate locations and may be interconnected in part using public networks, such as the Internet. One illustrative configuration for datacenter 502 that implements the concepts and technologies disclosed herein is described below with regard to FIG. 5.

Entities of web services platform 508 may access the compute resources (e.g., network resources) provided by datacenters 502 over a wide area network (WAN) 506. Although a WAN is illustrated in FIG. 5, it should be appreciated that a local area network (LAN), the Internet, or any other networking topology known in the art that connects datacenters 502 to remote entities and other users may be utilized. It should also be appreciated that combinations of such networks may also be utilized.

An entity or other entities that are customers of web services platform 508 may utilize a customer computing system 504 to access the compute resources provided by datacenters 502. Customer computing system 504 comprises a computer capable of accessing web services platform 508, such as a server computer, a desktop or laptop personal computer, a tablet computer, a wireless telephone, a PDA, an e-reader, a game console, a set-top box, or any other network resource.

As is described in greater detail below, customer computing system 504 may be utilized to configure aspects of the compute resources provided by web services platform 508. In this regard, web services platform 508 may provide a web interface through which aspects of its operation may be configured through the use of a web browser application program executing on customer computing system 504. Alternatively, a stand-alone application program executing on customer computing system 504 may access an application programming interface (API) (not shown) exposed by web services platform 508 for performing the configuration operations. Other mechanisms for configuring the operation of web services platform 508, including launching new virtual machine instances on web services platform 508, may also be utilized.

According to aspects disclosed herein, capacities of purchased compute resources provided by web services platform 508 may be scaled in response to demand. In this regard, scaling refers to the process of instantiating, which may also be referred to herein as "launching" or "creating," or terminating, which may also be referred to herein as "de-scaling," instances of compute resources in response to demand.

Web services platform 508 may also be configured with a deployment component to assist entities in the deployment of new instances of compute resources. The deployment component may receive a configuration from an entity that may include data describing how new instances should be configured. For example, the configuration may specify at least one applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of compute resources.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b, and 610c (e.g., network resources) within a data center 620. Alternatively, client applications 602b may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610a, 610b, and 610c, operating within data center 620 (which may be similar in data center 502), may be provided via gateway 606 and router 608. Numerous other network configurations may also be employed. Although not explicitly depicted in FIG. 6, various authentication mechanisms, web service layers, business objects or other intermediate layers may be provided to mediate communication with the processes executing on computing nodes 610a, 610b, and 610c. Some of these intermediate layers may themselves comprise processes executing on one or more of the computing nodes. Computing nodes 610a, 610b, and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618 and one or more storage devices 614.

Processes on computing node 610a may execute in conjunction with an operating system or alternatively may execute as a bare-metal process that directly interacts with physical resources, such as processors 616, memories 618, or storage devices 614.

Computing nodes 610b and 610c are depicted as operating on virtual machine host 612, which may provide shared access to various physical resources, such as physical processors, memory and storage devices. Any number of virtualization mechanisms might be employed to host the computing nodes.

The various computing nodes depicted in FIG. 6 may be configured to host web services, database management systems, business objects, monitoring and diagnostic facilities, and so forth. The computing nodes can be or comprise network resources. Network resources may be services or compute processes executing via one or more computing nodes. A computing node may refer to various types of computing resources, such as personal computers, servers, clustered computing devices, and so forth. A computing node may, for example, refer to various computing devices, such as cell phones, smartphones, tablets, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

In at least some embodiments, a server that implements a portion or all of one or more of the technologies described herein may include a general-purpose computer system that includes or is configured to access one or more computer-accessible media.

FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor(s) 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes or network resources.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other network resource may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
   receiving, by a computing device, a request to configure a first network resource;
   determining, by the computing device, a dependency of a second network resource on the first network resource, wherein the dependency of the second network resource comprises a computing dependency that facilitates an operation of the second network resource based on the first network resource;
   determining, by the computing device, a permission state of a source of the request;
   denying, by the computing device, the request to configure based at least in part on the determined dependency of the second network resource on the first network resource and the permission state of the source of the request, wherein the denying the request inhibits disruption of the operation of the second network resource caused by the requested configuration of the first network resource; and
   transmitting an alert to the source of the request to configure, the alert comprising information relating to the dependency of the second network resource on the first network resource and the denying of the request.

2. The method of claim 1, wherein the request to configure comprises at least one of creating the first network resource, deleting the first network resource, moving the first network resource, and changing access controls relating to the first network resource.

3. The method of claim 1, wherein at least one of the first network resource and the second network resource comprises at least one of a compute cloud service, a cloud storage service, a relational database service, a NoSQL database service, a non-relational data storage service, a workflow service, a queue service, a notification service, a customer application, and a content delivery service.

4. A non-transitory computer-readable storage medium having stored thereon instructions that, upon execution by one or more computing nodes, cause the one or more computing nodes at least to:
receive a request to configure a first network resource of a plurality of network resources;
receive a request to configure a second network resource of the plurality of network resources; and
tag at least one of the first network resource and the second network resource to represent a dependency between the first network resource and the second network resource in response to at least one of the request to configure the first network resource and the request to configure the second network resource, wherein the dependency comprises a computing dependency that facilitates the operation a feature of one of the first network resource and the second network resource based on the other of the first network and the second network resource, and wherein the tag facilitates the grant or denial of subsequent requests to configure one or more of the first network resource and the second network resource, based on at least the determined dependency.

5. The non-transitory computer-readable storage medium of claim 4, wherein at least one of the request to configure the first network resource and the request to configure the second network resource comprises creating the first network resource, deleting the first network resource, or moving the first network resource.

6. The non-transitory computer-readable storage medium of claim 4, wherein at least one of the first network resource and the second network resource comprises at least one of a compute cloud service, a cloud storage service, a relational database service, a NoSQL database service, a non-relational data storage service, a workflow service, a queue service, a notification service, and a content delivery service.

7. The non-transitory computer-readable storage medium of claim 4, wherein the dependency between the first network resource and the second network resource comprises a criticality of the dependency.

8. The non-transitory computer-readable storage medium of claim 4, wherein tagging at least one of the first network resource and the second network resource comprises storing at least dependency information as metadata associated with the at least one of the first network resource and the second network resource.

9. The non-transitory computer-readable storage medium of claim 4, wherein tagging at least one of the first network resource and the second network resource comprises storing dependency information as a key-value pair associated with the at least one of the first network resource and the second network resource.

10. The non-transitory computer-readable storage medium of claim 4, wherein tagging the at least one of the first network resource and the second network resource comprises automatically retrieving dependency information from at least one of metadata or a database and associating the retrieved dependency information with the at least one of the first network resource and the second network resource.

11. A system comprising:
one or more computing nodes; and
one or more memories bearing instructions that, upon execution by the one or more computing nodes, cause the system at least to:
determine information defining a dependency between a first network resource and a second network resource, wherein the dependency comprises a computing dependency that facilitates the operation a feature of one of the first network resource and the second network resource based on the other of the first network and the second network resource;
tag at least one of the first network resource and the second network resource to represent the dependency between the first network resource and the second network resource;
deny a request to configure the first network resource based at least in part on the determined dependency between the first network resource and the second network resource; and
transmit an alert to a source of the request to configure, the alert comprising information relating to the dependency between the first network resource and the second network resource.

12. The system of claim 11, wherein the request to configure comprises at least one of creating the first network resource, deleting the first network resource, and moving the first network resource.

13. The system of claim 11, wherein at least one of the first network resource and the second network resource comprises at least one of a compute cloud service, a cloud storage service, a relational database service, a NoSQL database service, a non-relational data storage service, a workflow service, a queue service, a notification service, and a content delivery service.

14. The system of claim 11, wherein information defining a dependency between a first network resource and a second network resource comprises determining a criticality of the dependency.

15. The system of claim 11, wherein denying the request to configure is based at least in part on the criticality of the dependency.

16. The system of claim 11, wherein denying the request to configure is based at least in part on a permission state of a source of the request.

17. The system of claim 16, wherein the permission state of the source of the request comprises an administrative permission state or a non-administrative permission state.

18. The system of claim 11, wherein the alert comprises an identification of the second network resource that depends on the first network resource.

19. The system of claim 11, wherein the alert comprises an identification of at least one features of the second network resource that depends on the first network resource.

20. The system of claim 11, wherein tagging the at least one of the first network resource and the second network resource comprises storing at least a portion of the determined information as a key-value pair associated with the at least one of the first network resource and the second network resource.

* * * * *